United States Patent
Iwata et al.

(10) Patent No.: US 11,225,903 B2
(45) Date of Patent: Jan. 18, 2022

(54) TURBOCHARGER

(71) Applicant: TOYOTA JIDOSHA KABUSHIKI KAISHA, Toyota (JP)

(72) Inventors: Akitoshi Iwata, Seto (JP); Osamu Igarashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 16/692,065

(22) Filed: Nov. 22, 2019

(65) Prior Publication Data
US 2020/0173352 A1 Jun. 4, 2020

(30) Foreign Application Priority Data

Nov. 29, 2018 (JP) ............................ JP2018-223247

(51) Int. Cl.
| | | |
|---|---|---|
| *F02B 37/18* | (2006.01) | |
| *F01D 17/10* | (2006.01) | |
| F02C 6/12 | (2006.01) | |
| F02B 39/00 | (2006.01) | |
| F02B 37/02 | (2006.01) | |

(52) U.S. Cl.
CPC .......... *F02B 37/186* (2013.01); *F01D 17/105* (2013.01); *F02B 37/025* (2013.01); *F02B 39/00* (2013.01); *F02C 6/12* (2013.01); *F05D 2220/40* (2013.01); *F05D 2260/606* (2013.01)

(58) Field of Classification Search
CPC ...... F02B 37/18; F02B 37/183; F02B 37/186; F02B 37/025; F02B 39/00; F01D 17/105; F02C 6/12; F05D 2220/40; F05D 2260/606; F16K 1/18; F16K 1/20; F16K 1/2007; F16K 1/2014; F16K 1/2021; F16K 1/2028; F16K 1/2035; F16K 1/2042; F16K 1/205; F16K 1/2057; F16K 1/2064; F16K 1/2071; F16K 1/2087; F16K 1/2085; F16K 1/2092
See application file for complete search history.

(56) References Cited

U.S. PATENT DOCUMENTS

| | | |
|---|---|---|
| 2010/0187460 A1 | 7/2010 | An et al. |
| 2012/0210709 A1* | 8/2012 | Cizek .................... F01D 17/105 60/602 |

(Continued)

FOREIGN PATENT DOCUMENTS

JP 2009-092026 A 4/2009

*Primary Examiner* — Jesse S Bogue
*Assistant Examiner* — Loren C Edwards
(74) *Attorney, Agent, or Firm* — Oliff PLC

(57) ABSTRACT

A turbocharger includes a turbine housing that has a bypass passage defined therein. The bypass passage connects a section of an exhaust passage on the upstream side of a turbine wheel to a section of the exhaust passage on the downstream side of the turbine wheel. A wastegate, which selectively opens and closes the bypass passage, is attached to the turbine housing. A valve seat for the wastegate is provided at an open edge of the bypass passage in the inner wall surface of the turbine housing. An abradable portion, which is a deformable portion, is adhered to the valve member of the wastegate. The abradable portion is configured to be deformed in accordance with the shape of the valve seat by contacting the valve seat when the bypass passage is shifted from the open state to the fully closed state.

4 Claims, 2 Drawing Sheets

(56) References Cited

U.S. PATENT DOCUMENTS

| | | | | |
|---|---|---|---|---|
| 2015/0125273 A1* | 5/2015 | Tschirschke | ........ | F02B 37/186 |
| | | | | 415/145 |
| 2016/0032818 A1* | 2/2016 | Mallett | ........ | F16K 1/2042 |
| | | | | 251/318 |

* cited by examiner

TURBOCHARGER

BACKGROUND

1. Field

The present disclosure relates to a turbocharger.

2. Description of Related Art

Japanese Laid-Open Patent Publication No. 2009-092026 discloses a turbocharger that includes a turbine wheel and a turbine housing accommodating the turbine wheel. The turbine housing has a bypass passage defined therein. The bypass passage connects a section of the exhaust passage on the upstream side of the turbine wheel to a section on the downstream side of the turbine wheel. A wastegate, which selectively opens and closes the bypass passage, is attached to the turbine housing. The wastegate includes a shaft rotationally supported by the wall of the turbine housing. The shaft has a support arm that extends from an end and outward in the radial direction of the shaft. The support arm supports a valve member such that the valve member is swingable relative to the support arm.

When fully closing the bypass passage in the turbocharger disclosed in Japanese Laid-Open Patent Publication No. 2009-092026, the shaft is rotated in a specific direction such that the valve member approaches the valve seat of the bypass passage. The valve member swings in accordance with the valve seat and closely contacts the valve seat to fully close the bypass passage.

In the turbocharger disclosed in Japanese Laid-Open Patent Publication No. 2009-092026, if the amount of swinging of the valve member with respect to the valve seat is insufficient, a gap may be created between the valve seat and the valve member in the fully closed state of the bypass passage. When an excessive gap is created between the valve seat and the valve member, an excessive amount of exhaust gas can leak from the bypass passage even if the wastegate is controlled to fully close the bypass passage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a turbocharger that includes a turbine housing and a wastegate is provided. The turbine housing accommodates a turbine wheel and has a bypass passage defined therein. The bypass passage connects a section of an exhaust passage that is on an upstream side of the turbine wheel to a section of the exhaust passage that is on a downstream side of the turbine wheel. The wastegate is attached to the turbine housing and selectively opens and closes the bypass passage. A valve seat for the wastegate is provided at an open edge of the bypass passage in an inner wall surface of the turbine housing. A deformable portion is provided on a first one of the valve seat and the wastegate. The deformable portion contacts a second one of the valve seat and the wastegate when the bypass passage is shifted from an open state to a fully closed state. The deformable portion is configured to be deformed in accordance with a shape of the second one of the valve seat and the wastegate by contacting the second one of the valve seat and the wastegate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to FIGS. 1 to 3. First, a schematic configuration of an internal combustion engine 100 of a vehicle will be described.

Figure 1:
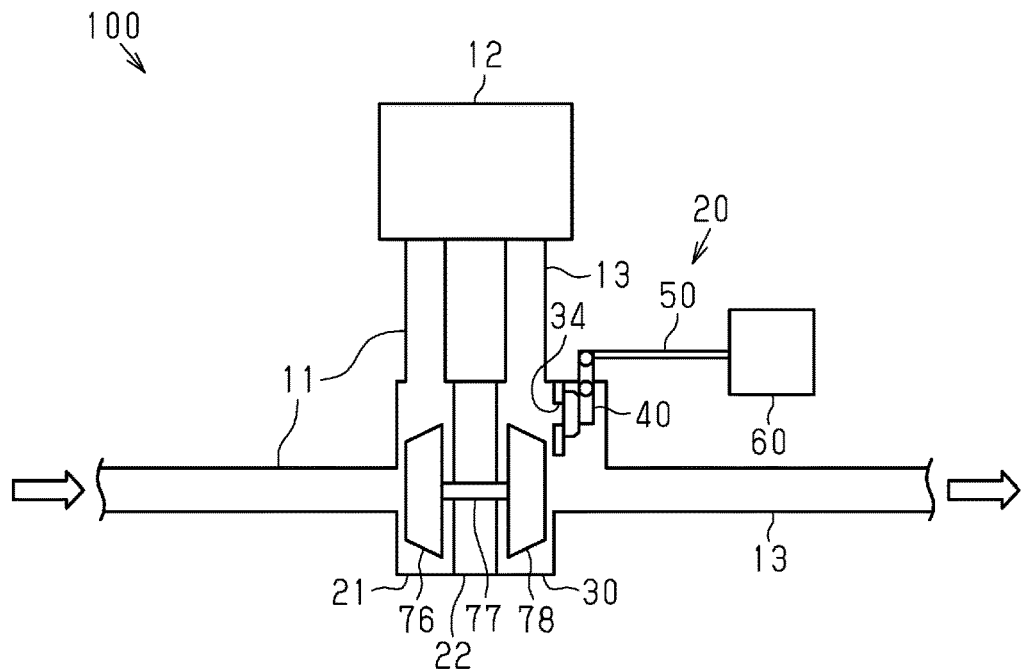
FIG. 1 is a schematic diagram of an internal combustion engine according to a first embodiment.

As shown in FIG. 1, the internal combustion engine 100 has an intake passage 11, through which intake air from the outside flows. The intake passage 11 is connected to a cylinder 12, which mixes fuel with intake air and burns the mixture. The cylinder 12 is connected to an exhaust passage 13 configured to discharge exhaust gas from the cylinder 12.

The internal combustion engine 100 has a turbocharger 20 configured to compress intake air using the flow of exhaust gas. The turbocharger 20 has a compressor housing 21, which is attached to the intake passage 11. The turbocharger 20 has a turbine housing 30 attached to the exhaust passage 13. The turbocharger 20 also has a bearing housing 22. The compressor housing 21 is connected to the turbine housing 30 via the bearing housing 22.

The turbine housing 30 accommodates a turbine wheel 78, which is rotated by the flow of exhaust gas. The turbine wheel 78 is connected to a first end of a connecting shaft 77. The central portion of the connecting shaft 77 is accommodated in the bearing housing 22. The connecting shaft 77 is rotationally supported by a bearing (not shown) in the bearing housing 22. The compressor housing 21 accommodates a compressor wheel 76. A second end of the connecting shaft 77 is connected to the compressor wheel 76.

Next, the turbine housing 30 of the turbocharger 20 and configurations related to the turbine housing 30 will be described.

Figure 2:
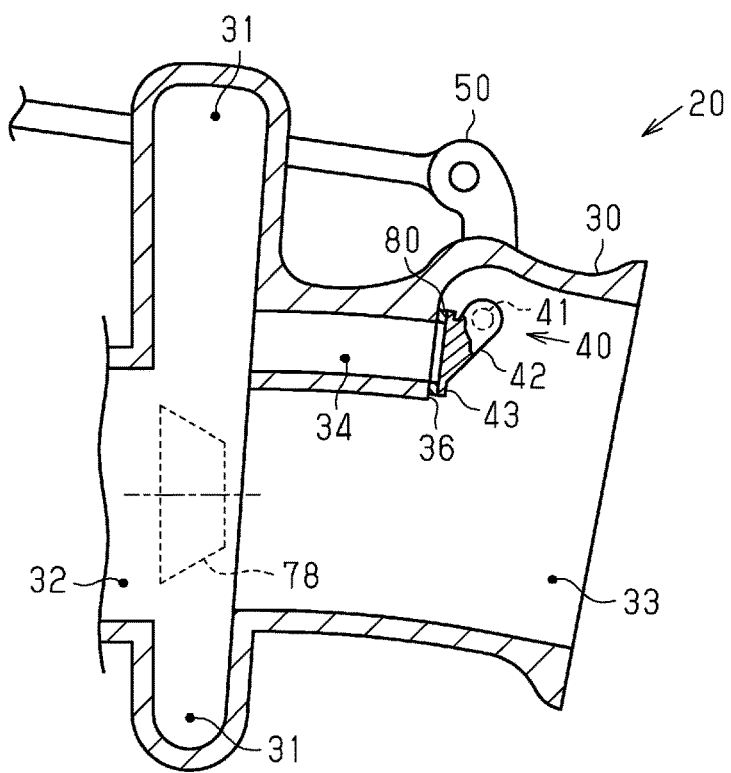
FIG. 2 is a cross-sectional view of a turbocharger according to the first embodiment.

As shown in FIG. 2, the turbine housing 30 has a scroll passage 31 defined therein. The scroll passage 31 is configured to draw in exhaust gas from the outside. The scroll passage 31 extends in a circumferential direction about the rotation axis of the turbine wheel 78 (the rotation axis of the connecting shaft 77) to surround the turbine wheel 78. The upstream end of the scroll passage 31 is connected to a section of the exhaust passage 13 that is on the upstream side of the turbine housing 30.

The turbine housing 30 has a substantially columnar accommodation space 32, in which the turbine wheel 78 is accommodated. The accommodation space 32 is connected to the downstream end of the scroll passage 31. The turbine housing 30 further has a discharge passage 33 configured to discharge exhaust gas to the outside. The discharge passage 33 is connected to the accommodation space 32 and extends generally in the direction of the rotation axis of the turbine wheel 78. The downstream end of the discharge passage 33 is connected to a section of the exhaust passage 13 that is on the downstream side of the turbine housing 30.

The exhaust gas blown onto the turbine wheel 78 through the scroll passage 31 is discharged to the exhaust passage 13 through the discharge passage 33. At this time, the turbine wheel 78 rotates as the exhaust gas that has passed through the scroll passage 31 is blown onto the turbine wheel 78. The rotation of the turbine wheel 78 causes the compressor wheel 76 to rotate via the connecting shaft 77, so that forced induction of the intake air is performed.

The turbine housing 30 has a bypass passage 34 defined therein. The bypass passage 34 connects the scroll passage 31 and the discharge passage 33 to each other. The bypass passage 34 connects a section of the scroll passage 31 on the upstream side of the turbine wheel 78 to a section of the discharge passage 33 on the downstream side of the turbine wheel 78. In the present embodiment, the scroll passage 31 and the discharge passage 33 constitute a part of the exhaust passage 13. The bypass passage 34 is a hole that has a substantially circular cross section and extends through the wall that defines the scroll passage 31 and the discharge passage 33. The downstream end of the bypass passage 34 opens in the inner wall surface of the turbine housing 30. The part of the inner wall surface of the turbine housing 30 that includes the downstream open edge of the bypass passage 34 serves as a valve seat 36. The surface of the valve seat 36 is flat.

The material of the turbine housing 30 is a heat-resistant cast steel, and the machinability index of the heat-resistant cast steel is, for example, approximately 20 to 50. The machinability index is a value indicating the ease of machining of a material with reference to that of a sulfur free-machining steel. Therefore, a material having greater machinability index is easier to machine.

The discharge passage 33 includes a wastegate 40 that selectively opens and closes the downstream end of the bypass passage 34. The wastegate 40 has a shaft 41 having a substantially circular cross section. The shaft 41 extends through the wall of the turbine housing 30 so that a part of the shaft 41 protrudes out of the turbine housing 30. The shaft 41 is rotationally supported by the wall of the turbine housing 30.

The end of the shaft 41 that protrudes out of the turbine housing 30 is coupled to a link mechanism 50. As shown in FIG. 1, the link mechanism 50 is coupled to an actuator 60 (for example, an electric motor), which is a drive source that selectively opens and closes the wastegate 40.

Figure 3:
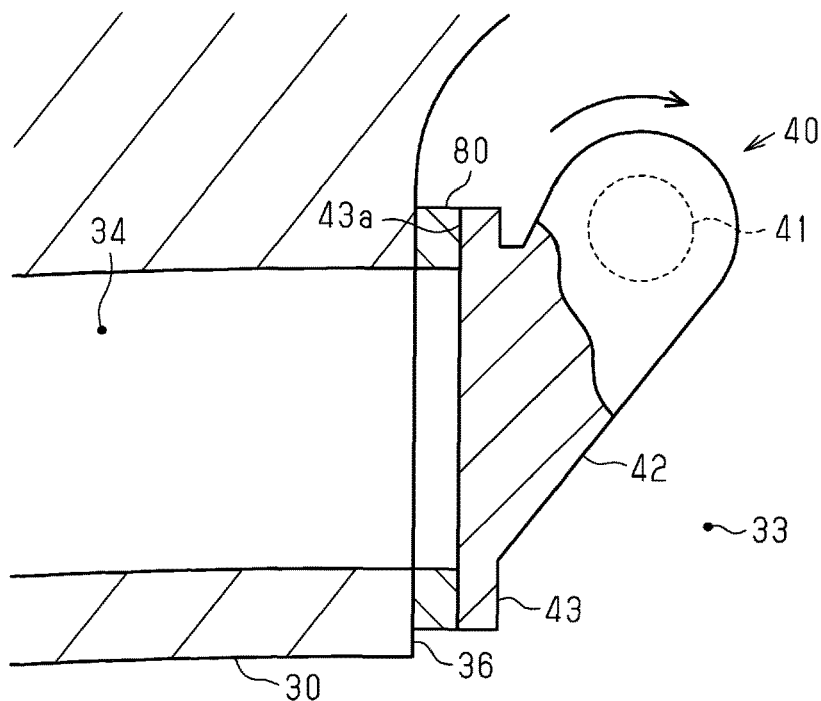
FIG. 3 is a cross-sectional view showing a wastegate and its surroundings according to the first embodiment.

As shown in FIG. 3, the end of the shaft 41 that protrudes into the turbine housing 30 is provided with a substantially pillar-shaped connection portion 42. The connection portion 42 extends radially outward from the shaft 41. A substantially disk-shaped valve member 43 is fixed to the end of the connection portion 42. In the present embodiment, the shaft 41, the connection portion 42, and the valve member 43 are molded integrally to constitute the wastegate 40. The outer diameter of the valve member 43 is larger than the inner diameter of the valve seat 36, that is, the diameter of the downstream-side opening of the bypass passage 34. The material of the whole wastegate 40, which includes the shaft 41, the connection portion 42, and the valve member 43, is a heat-resistant steel, and the machinability index of the heat-resistant steel is, for example, approximately 20 to 50.

An abradable portion 80, which is a deformable portion, is adhered to an opposed surface 43a of the valve member 43. The abradable portion 80 extends along the outer periphery of the opposed surface 43a of the valve member 43 and has an annular shape as a whole. The outer diameter of the abradable portion 80 is substantially the same as the outer diameter of the valve member 43. The inner diameter of the abradable portion 80 is substantially the same as the inner diameter of the valve seat 36. The material of the abradable portion 80 is, for example, a nickel-aluminum alloy, and the machinability index of the nickel-aluminum alloy is, for example, approximately 180 to 300. The abradable portion 80 is formed by thermal spraying and has pores inside. Accordingly, the machinability index of the material of the abradable portion 80 is greater than the machinability indexes of the materials of the valve seat 36 in the turbine housing 30 and the valve member 43 of the wastegate 40. In FIGS. 2 and 3, the thickness of the abradable portion 80 in the direction of the central axis is exaggerated.

The operation and advantages of the first embodiment will now be described.

When the bypass passage 34 is shifted from the open state to the fully closed state as shown in FIG. 3, the shaft 41 is rotated in the circumferential direction of the shaft 41 (clockwise as viewed in FIG. 3) by the actuator 60. This rotates the valve member 43 together with the shaft 41, so as to approach the valve seat 36. Since the valve member 43 is integrated with the shaft 41, the valve member 43 cannot swing relative to the shaft 41. Therefore, even if the abradable portion 80 is designed to closely contact the valve seat 36 in the fully closed state of the wastegate 40, the abradable portion 80 may fail to closely contact the valve seat 36 and a gap may be created between the abradable portion 80 and the valve seat 36 due to manufacturing errors of the wastegate 40 and the valve seat 36.

For example, the distance between the shaft 41 and the valve seat 36 is shorter than the designed distance in some cases. In that case, the lower portion of the abradable portion 80, which is farther from the shaft 41, does not contact the valve seat 36, while the upper portion of the abradable portion 80, which is closer to the shaft 41, contacts the valve seat 36. Accordingly, a gap is created between the valve member 43 and the valve seat 36 even if the wastegate 40 is controlled to fully close the bypass passage 34.

In the present embodiment, since the machinability index of the abradable portion 80 is great, the abradable portion 80 is easily worn by contacting the valve seat 36. Therefore, in the above-described configuration, in which a part of the abradable portion 80 contacts the valve seat 36 in order to shift the bypass passage 34 from the open state to the fully closed state, repetitive shifting of the bypass passage 34 to the fully closed state wears the part of the abradable portion 80 that contacts the valve seat 36, while the part that does not contact the valve seat 36 is not worn. Accordingly, the abradable portion 80 is gradually worn in accordance with the shape of the valve seat 36. Thus, even if a gap exists between the abradable portion 80 and the valve seat 36 when the abradable portion 80 has not been worn, the gap between the abradable portion 80 and the valve seat 36 is gradually reduced. As a result, the abradable portion 80 and the valve seat 36 are allowed to closely contact each other in the fully closed state of the bypass passage 34.

In the fully closed state of the bypass passage 34, the contact pressure between the abradable portion 80 and the valve seat 36 needs to be higher than or equal to a predetermined value in order to prevent exhaust gas from leaking from the bypass passage 34 to the discharge passage 33. Therefore, if the surface of the valve seat 36 is uneven or warped, the contact pressure in a part of the region in which the abradable portion 80 and the valve seat 36 contact each other may be less than the predetermined value, so that exhaust gas leaks from the bypass passage 34 to the discharge passage 33.

In the present embodiment, even if the surface of the valve seat 36 is not completely flat and is slightly uneven or warped, the abradable portion 80 is worn so as to be shaped in accordance with the shape of the valve seat 36. Thus, in the entire region in which the abradable portion 80 and the valve seat 36 contact each other, the contact pressure between the abradable portion 80 and the valve seat 36 is equalized. Therefore, the contact pressure between the abradable portion 80 and the valve seat 36 is unlikely to be excessively reduced, so that the exhaust gas in the bypass passage 34 is prevented from leaking to the discharge passage 33.

Second Embodiment

A second embodiment will now be described with reference to FIG. 4. In the second embodiment, the differences from the first embodiment will mainly be discussed, and like or the same reference numerals are given to those components that are like or the same as the corresponding components of the first embodiment. Specific description of these components is omitted or simplified.

Figure 4:
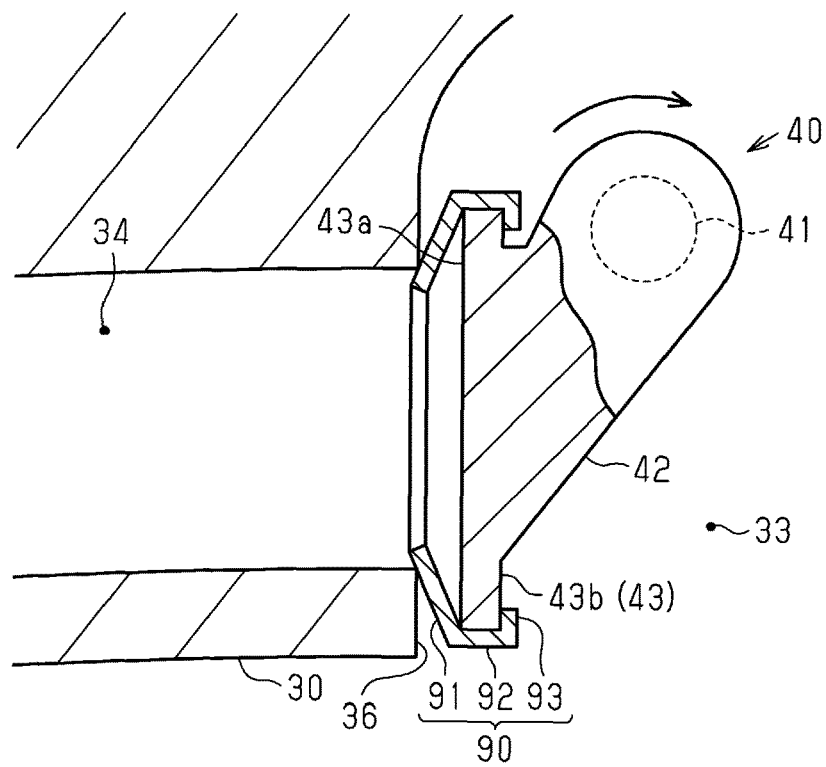
FIG. 4 is a cross-sectional view showing a wastegate and its surroundings according to a second embodiment.

As shown in FIG. 4, a disk spring 90, which is a deformable portion, is fixed to the valve member 43. The disk spring 90 has an annular portion 92, which extends to surround the outer circumferential surface of the valve member 43 and has an annular shape as a whole. The inner diameter of the annular portion 92 is substantially the same as the outer diameter of the valve member 43. On a back surface 43b of the valve member 43, a fixing portion 93 protrudes radially inward from the end of the annular portion 92. The fixing portion 93 extends along the outer periphery of the back surface 43b of the valve member 43 and has an annular shape as a whole. The annular portion 92 and the fixing portion 93 are fixed to the valve member 43 by welding. On the opposed surface 43a of the valve member 43, a spring portion 91 protrudes radially toward the central axis of the annular portion 92 from the end of the annular portion 92. That is, the spring portion 91 protrudes from the valve member 43 toward the valve seat 36 in the fully closed state of the bypass passage 34. The spring portion 91 is curved to approach the radial center of the annular portion 92 toward the protruding end. The spring portion 91 is elastically deformable in the direction of the central axis of the spring portion 91. The spring portion 91 is provided over the entire circumference of the annular portion 92 and has an annular shape as a whole.

The operation and advantages of the second embodiment will now be described.

When the bypass passage 34 is shifted from the open state to the fully closed state as shown in FIG. 4, the shaft 41 is rotated in the circumferential direction of the shaft 41 (clockwise as viewed in FIG. 4) by the actuator 60. This rotates the valve member 43 together with the shaft 41, so as to approach the valve seat 36.

It is now assumed that, for example, the upper portion of the spring portion 91, which is closer to the shaft 41, first contacts the valve seat 36. The upper portion of the spring portion 91, which is closer to the shaft 41, is elastically deformed by being compressed in the direction of the central axis of the spring portion 91. When the shaft 41 rotates further, the upper portion of the spring portion 91, which is close to the shaft 41, is pressed against the valve seat 36 to be elastically deformed by a great amount. In contrast, although the lower portion of the spring portion 91, which is farther from the shaft 41, contacts the valve seat 36, the lower portion is elastically deformed by a small amount since it is pressed against the valve seat 36 by a small force.

As described above, even if the distance between the valve member 43 and the valve seat 36 differs between the side closer to the shaft 41 and the side farther from the shaft 41 in the fully closed state of the bypass passage 34, the difference in the distance between the valve member 43 and the valve seat 36 is cancelled by the difference in the amount of elastic deformation of the spring portion 91. Therefore, the spring portion 91 and the valve seat 36 are allowed to closely contact in the fully closed state of the bypass passage 34.

Also, the spring portion 91 is elastically deformed in accordance with the shape of the valve seat 36 when the bypass passage 34 is shifted from the open state to the fully closed state. Therefore, as in the case of, for example, the abradable portion 80 of the first embodiment, a sufficient close contact between the disk spring 90 and the valve seat 36 is readily ensured without the need to wait for irreversible deformation of the disk spring 90 caused by repetitive shifting of the bypass passage 34 to the fully closed state.

When the bypass passage 34 is in the fully closed state, the spring portion 91 of the disk spring 90 contacts the valve seat 36, so that the spring portion 91 is curved radially inward. At this time, the spring portion 91 is elastically deformed as if it is compressed in the direction of the central axis of the spring portion 91. The wastegate 40 selectively opens and closes the downstream end of the bypass passage 34. Thus, in the fully closed state of the bypass passage 34, the pressure in the bypass passage 34 is relatively high. When the pressure in the bypass passage 34 acts on the disk spring 90, the spring portion 91 is pushed radially outward. This reduces the compression amount of the spring portion 91 in the direction of the central axis. Thus, as compared to a case in which the pressure in the bypass passage 34 does not act on the disk spring 90, the amount of elastic deformation of the spring portion 91 in the direction of the central axis is reduced. This suppresses relaxation of the spring portion 91, which will cause the spring portion 91 to be unable to return to the original state due to excessive elastic deformation.

The above-described embodiments may be modified as follows. The above-described embodiments and the following modifications can be combined as long as the combined modifications remain technically consistent with each other.

In the first embodiment, the shape of the abradable portion 80 may be changed as long as the abradable portion 80 is able to contact at least the open edge on the downstream side of the bypass passage 34, that is, the entire open edge of the valve seat 36. For example, the abradable portion 80 may have a disk shape that covers the entire opposed surface 43a of the valve member 43.

The materials of the turbine housing 30, the wastegate 40, and the abradable portion 80 in the first embodiment are merely exemplary and may changed as required. Whatever materials are used for the turbine housing 30 (the valve seat 36) and the wastegate 40 (the valve member 43), the abradable portion 80 prevents leakage of exhaust gas in the fully closed state of the bypass passage 34 if the machinability index of the material of the abradable portion 80 is greater than the machinability indexes of the materials of the turbine housing 30 and the wastegate 40.

In the first embodiment, the object to which the abradable portion 80 is adhered may be changed. Specifically, the abradable portion 80 may be adhered to the valve seat 36, instead of the valve member 43. Further, the abradable portion 80 may be adhered to both of the valve member 43 and the valve seat 36.

In the second embodiment, the disk spring 90 may be fixed to the valve seat 36, instead of the valve member 43.

In the second embodiment, the shape of the disk spring 90 may be changed. For example, the annular portion 92 and the fixing portion 93 may be omitted if the spring portion 91 of the disk spring 90 is fixed to the opposed surface 43a of the valve member 43, for example, by welding.

The spring portion 91 may be curved radially outward from the annular portion 92 toward the protruding end if there is a low probability of relaxation of the spring portion 91 of the disk spring 90. Specifically, if the spring portion 91 is fixed to the center portion of the opposed surface 43a of the valve member 43, the spring portion 91 is allowed to contact the valve seat 36 even if the spring portion 91 is curved radially outward. In order to suppress the relaxation of the spring portion 91 of the disk spring 90, the rotating amount of the valve member 43, which is rotated by the actuator 60, may be reduced, so that the amount of elastic deformation of the spring portion 91 is reduced.

In the first and second embodiments, the wastegate 40 may open and close the upstream end of the bypass passage 34.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A turbocharger comprising:
a turbine housing that accommodates a turbine wheel and has a bypass passage defined therein, the bypass passage connecting a section of an exhaust passage that is on an upstream side of the turbine wheel to a section of the exhaust passage that is on a downstream side of the turbine wheel; and
a wastegate that is attached to the turbine housing and selectively opens and closes the bypass passage, wherein
a valve seat for the wastegate is at an open edge of the bypass passage in an inner wall surface of the turbine housing,
a deformable portion is on a first one of the valve seat and the wastegate, the deformable portion contacting a second one of the valve seat and the wastegate when the bypass passage is shifted from an open state to a fully closed state,
the deformable portion is configured to be deformed in accordance with a shape of the second one of the valve seat and the wastegate by contacting the second one of the valve seat and the wastegate,
the deformable portion is an abradable portion that is made of a material having a machinability index greater than that of materials of the valve seat and the wastegate, and
the material of the abradable portion is a nickel-aluminum alloy.

2. A turbocharger comprising:
a turbine housing that accommodates a turbine wheel and has a bypass passage defined therein, the bypass passage connecting a section of an exhaust passage that is on an upstream side of the turbine wheel to a section of the exhaust passage that is on a downstream side of the turbine wheel; and
a wastegate that is attached to the turbine housing and selectively opens and closes the bypass passage, wherein
a valve seat for the wastegate is at an open edge of the bypass passage in an inner wall surface of the turbine housing,
a deformable portion is on a first one of the valve seat and the wastegate, the deformable portion contacting a second one of the valve seat and the wastegate when the bypass passage is shifted from an open state to a fully closed state, and
the deformable portion is configured to be deformed in accordance with a shape of the second one of the valve seat and the wastegate by contacting the second one of the valve seat and the wastegate,
the deformable portion is a disk spring having an annular spring portion, and
in the fully closed state of the bypass passage, the spring portion is bent radially inward of a radial exterior of the spring portion and radially inward of the open edge and protrudes from the first one of the valve seat and the wastegate and contacts the second one of the valve seat and the wastegate, and opposite sides of the spring portion are exposed to pressure from the bypass passage.

3. The turbocharger according to claim 2, wherein
the wastegate is configured to selectively open and close a downstream end of the bypass passage, and
the disk spring is fixed to the wastegate.

4. A turbocharger comprising:
a turbine housing that accommodates a turbine wheel and has a bypass passage defined therein, the bypass passage connecting a section of an exhaust passage that is on an upstream side of the turbine wheel to a section of the exhaust passage that is on a downstream side of the turbine wheel; and a wastegate that is attached to the turbine housing and selectively opens and closes the bypass passage, wherein a valve seat for the wastegate is at an open edge of the bypass passage in an inner wall surface of the turbine housing, a deformable portion is on a first one of the valve seat and the wastegate, the deformable portion contacting a second one of the valve seat and the wastegate when the bypass passage is shifted from an open state to a fully closed state, the deformable portion is configured to be deformed in accordance with a shape of the second one of the valve seat and the wastegate by contacting the second one of the valve seat and the wastegate, the deformable portion is an abradable portion that is made of a material having a machinability index greater than that of materials of the valve seat and the wastegate, and the abradable portion is formed to have pores inside.

* * * * *